United States Patent [19]

Edwards et al.

[11] Patent Number: 4,659,754
[45] Date of Patent: Apr. 21, 1987

[54] DISPERSIONS OF FIBRES IN RUBBER

[75] Inventors: Douglas C. Edwards; James A. Crossman, both of Sarnia, Canada

[73] Assignee: Polysar Limited, Sarnia, Canada

[21] Appl. No.: 798,875

[22] Filed: Nov. 18, 1985

[51] Int. Cl.[4] ............................................... C08J 3/20
[52] U.S. Cl. ...................................... 523/214; 524/35; 524/452; 524/455; 524/494; 524/513; 524/514
[58] Field of Search ............... 524/452, 454, 455, 494, 524/496, 514, 513, 35; 523/214

[56] References Cited

U.S. PATENT DOCUMENTS

| | | | |
|---|---|---|---|
| 3,652,380 | 3/1972 | Strack | 524/452 |
| 3,976,608 | 8/1976 | Buckler | 524/494 |
| 4,101,050 | 7/1978 | Buckler | 524/452 |
| 4,131,592 | 12/1978 | Davis | 524/452 |
| 4,263,184 | 4/1981 | Leo et al. | 525/935 |
| 4,368,283 | 1/1983 | Kishida | 524/494 |
| 4,521,553 | 6/1985 | Fitton | 524/496 |
| 4,560,718 | 12/1985 | Ritchey | 524/494 |

Primary Examiner—Paul R. Michl
Attorney, Agent, or Firm—Stevens, Davis, Miller & Mosher

[57] ABSTRACT

Polymer-fibre mixtures with improved homogeniety of dispersion of fibres throughout the polymer matrix are prepared from fibres prior mixed or coated with a plasticizer which is compatible with both the fibre and the polymer matrix. Then the plasticizer-fibre combination can be mixed into the polymer matrix, using standard polymer mixing equipment and for reasonable lengths of time, to produce a mixture in which agglomerations of fibres are very materially reduced. A preferred fibre is a fibrillated aramid fibre, dispersion of which in polymers has previously caused particular difficulties. Suitable polymers include hydrocarbon elastomers such as SBR, for use with which an aromatic mineral oil is a preferred plasticizer, and oil-resistant NBR elastomers, for use with which an ester plasticizer such as dioctyl phthalate is preferred.

23 Claims, No Drawings

DISPERSIONS OF FIBRES IN RUBBER

FIELD OF THE INVENTION

The present invention relates to mixtures of polymers and fibrous materials, and processes for their preparation. More particularly, the present invention relates to fibrous compositions for use in making fibre-filled or fibre-reinforced polymers, to processes for preparing such fibrous compositions, and processes of using such fibrous compositions to prepare fibre-filled or fibre reinforced polymers.

DESCRIPTION OF THE PRIOR ART

A great variety of materials are known in the art for use as fillers and/or reinforcing materials for plastics and for rubbers. Fillers are normally considered to be largely non-reinforcing and are usually selected from the particulate inorganic compounds. Reinforcing materials are usually selected from particulate carbon blacks and certain particulate inorganic compounds. Fibrous materials frequently are added to rubber compounds to improve various properties in rubbers and to reduce the requirement for fabric reinforcement. Suitable such fibres include asbestos, cellulose fibres, glass fibres, cotton and various synthetic organic fibres such as polyester and rayon. The fibre may be used as short fibres, for example chopped fibres, or as longer fibres. An important facet of the use of such fibres is the incorporation of the fibres into the polymer matrix. Satisfactory dispersion of the fibres within the polymer matrix, to form substantially homogeneous mixtures, can be difficult to achieve, particularly in the case of fibrillated fibres, without resort to uneconomically long or severe mixing procedures. Fibres offering the most desirable combination of physical properties to effect reinforcement of a polymer composition, e.g. fibrillated aramid polymers, in many cases present the most difficult dispersion problems.

U.S. Pat. No. 4,263,184 discloses a homogeneous pre-dispersed fibre composition prepared by mixing a latex of a polymer with fibrous material to form a wetted fibre mixture and mixing a coagulant with the wetted fibre mixture to form the pre-dispersed fibre composition.

SUMMARY OF THE PRESENT INVENTION

It is an object of the present invention to provide novel fibrous compositions for dispersion in polymer matrices.

It is a further object of the present invention to provide a novel process for preparation of fibre-reinforced polymer compositions.

In accordance with the present invention, it has been discovered that fibres can be dispersed in polymer matrices, simply and efficiently, if the fibrous material, prior to contacting the polymer matrix, is treated with a plasticizer with which both the chosen fibrous material and the chosen polymer matrix are compatible. The plasticizer is dispersed within the mass of fibrous material, to create a plasticized fibre composition. Then this composition is mixed with the polymer matrix, with which the plasticizer is also compatible. As a result, ordinary polymer mixing equipment such as mills and internal mixers can be used, with economically acceptable mixing times under mild conditions, to prepare homogeneously dispersed fibre-polymer compositions.

Thus according to one aspect of the present invention, there is provided a plasticized fibre composition useful for reinforcing polymers, said composition comprising 100 parts by weight of fibres selected from the group consisting of cellulose fibres, mineral fibres, synthetic inorganic fibres and synthetic organic fibres, and mixtures of two or more of said types of fibres, and from about 50 to about 200 parts by weight of a plasticizer that is liquid at processing temperatures, said plasticizer being compatible with the chosen fibre or fibres and substantially homogeneously dispersed thereon so as effectively to wet the fibre surfaces with plasticizer.

According to another aspect of the present invention, there is provided a process for providing mixtures of polymers and fibrous materials, which comprises forming a substantially homogeneous plasticized fibrous material composition by treating the fibrous material with an effective amount of a plasticizer that is liquid at processing temperatures; mixing the plasticized fibrous material with a polymer; the plasticizer being compatible with both the fibrous material and the polymer.

DESCRIPTION OF THE PREFERRED EMBODIMENTS

The polymers which may be used in this invention are selected from natural rubber and a wide variety of synthetic polymeric materials, both elastomeric and thermoplastic polymeric materials. The synthetic polymeric materials may be polymers produced by solution polymerization, emulsion polymerization, bulk polymerization or the like. Examples of suitable elastomeric polymers which may be used include natural rubber, styrene-butadiene copolymers, polyisoprene, butadiene-acrylonitrile copolymers, carboxylated styrene-butadiene polymers, carboxylated butadiene-acrylonitrile polymers, polymers comprising chloroprene, polymers comprising acrylic monomers such as ethylene-acrylic acid polymers and the acrylate polymers and copolymers, ethylene-propylene copolymers, polybutadiene, styrene-butadiene block copolymers, butyl rubber (polyisobutylene-isoprene) and halogenated butyl rubbers, EPDM rubbers and halogenated EPDM rubbers, silicone rubbers (polysiloxanes), chlorosulphonated polyethylene and the like. Among the thermoplastic polymers which may be used in the present invention are included polyethylene and the thermoplastic copolymers of ethylene, polypropylene and the thermoplastic copolymers of propylene, polystyrene and impact polystyrene, polybutene, polyvinylchloride and the thermoplastic copolymers of vinyl chloride, polyvinylidene chloride and the thermoplastic copolymers of vinylidene chloride, styrene-acrylonitrile polymers, butadiene-styrene-acrylonitrile polymers, polyesters, polyamides, polycarbonates etc.

Preferred among the polymers for use in the present invention are the elastomeric polymers, from which the preferred are natural rubber, styrene-butadiene polymers in which the average styrene content of the polymer is from about 15 to about 40% by weight, mixtures of two or more styrene-butadiene polymers in which the average styrene content is from about 45–60% by weight, butadiene-acrylonitrile polymers in which the acrylonitrile content is from about 20% to about 50% by weight, ethylene propylene copolymers, EPDM rubbers and the halogenated (chlorinated or brominated) EPDM rubbers, butyl and the halogenated (chlorinated or brominated) butyl rubbers, chlorosulphonated polyethylenes, silicone rubbers, polybutadiene, polyisoprene and polychloroprene.

The fibrous material which may be used in this invention includes cellulose fibres such as cellulose, modified cellulose, cotton, jute, wood pulp and sisal, the mineral fibres such as asbestos and mineral wool, synthetic inorganic fibres such as glass fibres and glass yarn and synthetic organic fibres such as rayon, nylon, polyester, polypropylene and aramid fibres. Preferred fibrous materials include fibres that are fibrillated especially such as to contain numerous fine diameter fibrils attached to the main fibre. An especially preferred fibrous material is the fibrillated aramid fibre which is polymeric paraphenylene terephthalamide aramid known as KEVLAR having a surface area greater than 1 $m^2/g$. The preferred KEVLAR in the form known as wet pulp has a fibre length of from about 1 to about 5 mm, preferably from about 2 to about 4 mm, has a BET surface area of from about 7 to about 12 $m^2/g$ and contains from about 40% to about 60% of water. Examples of wet pulp have been described by DuPont as merge #6F104 and #F205 and as having Canadian Standard Freeness, respectively, of 450–575 and 300–425. Such fibrous material may be mixed with water and readily forms very thick suspensions of high viscosity even at concentrations of only about 2 weight % in water. If the fibrous material is used as such or is dried to remove the residual water associated with the wet pulp, it has been found that it is impossible to form a uniform mixture (using any of the conventional polymer mixing equipment) of the fibrous material with any of the polymers described above under conditions which those skilled in the art would regard as practical. The fibres do not disperse evenly in the polymer, and occur as agglomerations of fibre within a polymer matrix.

In accordance with the present invention, this problem is largely overcome by the prior application to the fibres of a suitable plasticizer, before mixing of the polymers and fibres is attempted. The plasticizer is chosen on the basis of its compatibility with both the polymer to form the matrix, and the fibres themselves. By compatibility with the fibre is meant that it will readily wet the fibres and disperse homogeneously thereon, effectively to coat the fibre surfaces.

Thus, suitable plasticizers may be selected from the hydrocarbon and mineral oils which may be predominantly paraffinic, naphthenic or aromatic in character; low molecular weight polymers such as polybutene, polybutadiene, silicone oil, polystyrene, polyisoprene and the like; esters of carboxylic acids such as dibutoxyethyl adipate, dibutyl or dioctyl phthalate, dioctyl sebacate, butyl oleate, triethylene glycol dibenzoate and the like; phosphoric acid esters such as tricresyl phosphate, tris-b-chloroethyl phosphate and the like, low molecular weight synthetic resins such as coumarone-indene resins, phenolic resins, polymerized aromatic resins and the like, all having melting points below about 150° C. and preferably below about 125° C.; liquid polyethers, liquid polyether/polythioethers; chlorinated paraffins; natural oils and resins and their derivatives such as rosin acid esters, hydrogenated rosins, pine tar, tall oil fatty acids, tall oil fatty acid esters, epoxidized soyabean oil, terpenes, terpene-phenolic resins and the like, the above listing being to illustrate such plasticizers and not to limit such materials. Suitable plasticizers will be liquid at processing temperatures—that is to say they will be liquid at temperatures at which the polymer is normally processed. For elastomeric polymers, such processing temperatures are normally below about 150° C. and preferably below about 125° C. For thermoplastic polymers such processing temperatures are up to about 250° C.

When the chosen matrix polymer is a hydrocarbon elastomer, it is preferred to use a hydrocarbon oil as plasticizer. The oil may be a paraffinic oil, an aromatic oil or a naphthenic oil, the selection of which oil to use with which polymer being well known in the art. Aromatic oils are especially preferred for use with styrene-butadiene copolymers, polybutadiene and natural rubber on account of their high degree of compatibility therewith. When the chosen matrix polymer is a butyl rubber or halogenated butyl rubber or an ethylene-propylene copolymer, paraffinic oils are especially preferred. For EPDM rubbers, naphthenic oils are especially preferred. All of these types of oils are in addition satisfactorily compatible with the preferred fibrillated fibres for use in the invention, especially fibrillated aramid fibres.

When the chosen matrix polymer is an oil-resistant polymer, such as butadiene-acrylonitrile rubbery copolymer, the preferred plasticizers are $C_4$–$C_{12}$ esters of dibasic organic acids, phosphate esters, polyethers and polyether/polythioethers. Most preferred among these is dioctyl phthalate, on account of its ready availability and relatively low cost, but other similar liquid diesters of phthalic, isophthalic, terephthalic, sebacic, adipic acids and the like are substantially technically as effective. The preferred phosphate ester is tricresyl phosphate. Again, all these types of plasticizers are satisfactorily compatible with the preferred fibrillated fibres used herein.

When the chosen matrix polymer is chlorobutyl or bromobutyl, hydrocarbon oil plasticizers are preferred. When the chosen matrix polymer is polychloroprene or chlorosulphonated polyethylene, suitable plasticizers include hydrocarbon oils and high molecular weight ethers and esters.

When the chosen matrix polymer is a silicone rubber, silicone oils are preferred as plasticizers, although others of the above-mentioned types can be used if desired. Silicone oils are also satisfactorily compatible with the preferred fibrillated fibres used herein.

The amount of plasticizer which is added to the fibre should preferably be sufficient to be homogeneously dispersed throughout the fibre mass, effectively to coat the exterior fibrillated fibre surfaces. On a weight basis, a suitable plasticizer:dry fibre weight ratio is from about 0.5:1 to about 2.0:1, preferably from about 0.8:1 to about 1.25:1.

The method by which the plasticizer is incorporated into the fibre mass is not critical, so long as a substantially homogeneous dispersion and surface wetting of the plasticizer throughout the fibre mass is achieved. The fibres may be dipped in a bath of the liquid plasticizer, sprayed therewith, surface spread with plasticizer, etc. Normally, the fibrous mass is formed into a sheet for such plasticizer treatment, and the amount of plasticizer applied is monitored by weight difference. The plasticizer may, if desired, be diluted with a volatile solvent or be applied as an emulsion at the time of application to the fibres, further to enhance the homogeneity of the dispersion. It is preferred to dry the fibres prior to application of the plasticizer thereto, and afterwards if the plasticizer has been applied as an aqueous emulsion, so as to prevent excessive water content in the final polymer-fibre mixture.

The fibre-plasticizer composition so formed can now be mixed with the polymer in standard mixing equipment, e.g. on a mill, in a banbury mixer etc., under standard conditions, to produce good fibre dispersions throughout the polymer matrix, in relatively short times. The concentration of fibrous material in the mixture of polymer and fibrous material is from about 0.25 to about 100 parts by weight of fibrous material per 100 parts by weight of polymer, preferably 0.25 to 20, most preferably 2 to 12 parts by weight per 100 parts by weight of polymer. The normal tendency of the fibres, especially the fibrillated aramid fibres, to form agglomerates and "clumps" within the polymer matrix is largely overcome. Whilst it is not intended that this invention should in any way be limited by theoretical considerations of modes of action and the like, it is believed that the presence of the plasticizer, on the fibres, renders the fibres more readily separable from one another even in their fibrillated condition. As the mixing with the polymer matrix proceeds, the plasticizer combines intimately with the polymer, and effectively leaves the fibre surfaces, but at this stage the fibre mass has already been substantially dispersed through the viscous polymer matrix, due to the mixing action, so that re-agglomeration of fibre clumps is effectively precluded. In any event, it is a fact that the same degree of fibre dispersion is not achieved when the fibres are added to a mixture of polymer and plasticizer, or when the plasticizer is added to a mixture of polymer and fibre. To achieve the beneficial effects of the invention, it is necessary to combine the plasticizer with the fibres first, and then mix this combination with the polymer. Then, fibre agglomeration is largely avoided and the maximum benefits of large fibre-polymer surface contacts can be achieved, in satisfactory mixing times.

The mixture of polymer and fibrous material may be used in many of the end uses normal for the polymer itself, such as various automotive products, tires, mechanical goods and the like as applicable for the type of polymer. For example, a KEVLAR fibre-styrene-butadiene mixture may be used in various aspects of tire construction including, but not limited to, the apex (which is the area above the bead wire sometimes referred to as filler or bead filler), as a carcass protecting layer under the tread and side wall, as a side wall component to improve cut and snag resistance, and in the undertread (sometimes called the base) to provide improved cut resistance especially for on/off road use in agricultural and such tires.

The mixture of polymer and fibrous material may also be used in mixtures with one or more compatible polymers. For example, it may be mixed with polymers not containing fibre to produce a final mixture containing a lesser content of fibrous material per 100 parts total polymers.

To illustrate, a mixture of styrene-butadiene polymer and fibrous material may be mixed with the sytrene-butadiene polymer containing no fibre and compounded in the usual way, or a mixture of a polymer comprising chloroprene and fibrous material may be mixed with a polymer comprising chloroprene and containing no fibre and compounded in the usual manner, or a mixture of a butadiene-acrylonitrile polymer and fibrous material may be mixed with polyvinyl chloride containing no fibre and then compounded in the usual way, or a mixture of styrene-butadiene polymer and fibrous material may be mixed with one or both of polybutadiene and natural rubber containing no fibre and compounded in the usual manner. In all such uses, the polymer-fibrous material mixture will be compounded in the usual way with rubber compounding ingredients, such as fillers, extenders or plasticizers, antioxidants or antiozonants and the like, and with vulcanization active aids using rubber mills or internal mixers. The compounded mixtures will be shaped and then vulcanized by maintaining at an elevated temperature for a period of time, such as by heating to about 140° C. to about 250° C. for times of from about 5 minutes to about 2 hours.

Vulcanizates containing the polymer-fibrous material of the invention possess improved properties when compared to vulcanizates of the same polymer containing no fibre. Such improved properties may include one or more of improved dimensional stability, increased modulus at low or moderate degrees of deformation and substantially increased resistance to tearing.

The following examples illustrate the invention, but are not to be interpreted as limiting. All parts are parts by weight unless expressly shown otherwise.

Also in these specific examples, the wet lap fibre used throughout was DuPont Kevlar 29 Aramid Pulp, Merge 6F205, 2 mm. Fibre dispersion in the polymer mixtures was evaluated visually, from 1 g samples of the mixtures pressed to a thin layer in a Preco Press at 100° C. under 6000 pound load, for 1.5 minutes. A sheet of about 10 cm diameter was obtained, lightly coloured and effectively translucent, in which agglomerations of fibres, or mats, are visible if present, and their sizes can be approximately measured.

EXAMPLE 1

A 1 g sample (dry basis) of fibre was dispersed in 100 mL of water using a Waring Blender. The dispersion was placed in an 8 oz. screw-capped bottle. 75 g of Sunthene 480 (naphthenic) oil was added and the capped bottle was shaken vigorously by hand. It was observed that the fibre transferred completely into the oil phase. The fibre was recovered by filtering through filter paper. The oil-wet fibre was dried in a vacuum oven at 80° C. to remove residual water. The dry weight was 6.9 g. The oil content was reduced by pressing the mixture between pieces of filter paper until the weight was reduced to 2 g. The resulting product was then a mixture of approximately equal parts by weight of oil and fibre.

1 g of this product was added to 5 g styrene-butadiene rubbery polymer SBR (KRYLENE 1502) on a micro-mill. Milling was continued for 3 minutes with continuous ¾ cuts. The mixture was finally given 4 endwise passes and sheeted off. The resulting product appeared very well dispersed. The inspection samples prepared as above showed that the dispersion was uniform except for the presence of about 12 small mats of less than 1 mm size. This result represents a quality of dispersion profoundly superior to what is observed when dried fibre without oil is milled with SBR under similar conditions.

EXAMPLE 2

A sample of the wet lap fibre sheet, as received from DuPont, was dried in a vacuum oven at 80° C. to remove the water. To a 1 g sample of the dried sheet, 1 g of Sunthene 480 oil was added directly in a dropwise manner so as to allow the oil to coat the fibre approximately uniformly. The resulting mixture was milled into KRYLENE 1502 (5 g) on a micro-mill for 4 minutes with continuous ¾ cuts, and the mixture was given 4 endwise passes and sheeted off. Inspection samples were prepared as before. Dispersion appeared very good; there were 10 visible mats, the largest being 1 mm in size.

EXAMPLE 3

The procedure of Example 2 was essentially repeated with other representative plasticizers. In this Example, the plasticizers were diluted with equal weights of a suitable volatile solvent so as to ensure uniform wetting of the dried lap sheets. The fibre samples were in sheet form (thickness about 0.5 mm) with dimensions about 5 cm×7.5 cm. The diluted plasticizers were added to the fibre using a disposable pipette, the weight being observed on a balance. This method provides a device for uniform wetting, but is complicated by loss of the volatile solvent during the application procedure. The actual weights of plasticizer added were determined by subsequent evaporation of the solvent (in a vacuum oven at 77° C.) and weighing.

The following Table 1 shows the materials used and the final compositions of the fibre/plasticizer mixtures.

TABLE 1

| EXPT. # | PLASTICIZER TYPE | SOLVENT | FIBRE/ PLASTICIZER (w/w) |
|---|---|---|---|
| 3-1 | paraffinic oil (Sunpar 2280) | n-hexane | 1/1.08 |
| 3-2 | naphthenic oil (Sunthene 480) | n-hexane | 1/1.06 |
| 3-3 | aromatic oil (Sundex 8125) | n-hexane | 1/1.12 |
| 3-4 | phthalic ester (Dioctyl Phthalate) | EtOH | 1/1.07 |
| 3-5 | adipic ester (Dioctyl Adipate) | EtOH | 1/1.06 |
| 3-6 | aliphatic ester (Hercoflex 600) | EtOH | 1/1.03 |
| 3-7 | ether/thioether (Plastikator OT) | EtOH | 1/1.08 |

1 g of each of the above mixtures was added to 5 g KRYLENE 1502 on the micro-mill. The milling conditions were standardized as follows:

Start at room temperature, cold water on.
Mill opening 0.45 mm for addition and milling, 0.16 mm for endwise passes.
Front roll 18 rpm, back roll 22 rpm.

The milling time was 4 minutes following addition of the fibre, with ¾ cuts at 30 second intervals. The mixes were then given 4 endwise passes and sheeted off.

In addition to the plasticizer-fibre mixtures, a control sample (0.5 g dried wet lap fibre, without plasticizer) was included for comparison. Final batch weights were all within one percent of the expected values.

1 g sheet specimens of the mixtures were pressed out as before. The observed results are given in Table 2.

TABLE 2

| | NUMBERS OF UNDISPERSED MATS | | | |
|---|---|---|---|---|
| EXPT. # | >1 mm | <1 mm | LARGEST (mm) | TOTAL |
| 3-1 | 10 | 19 | 2.5 × 2 | 29 |
| 3-2 | 4 | 16 | 2 × 1 | 20 |
| 3-3 | 0 | 3 | .7 × .7 | 3 |
| 3-4 | 8 | 25 | 2 × 1 | 33 |
| 3-5 | 8 | 31 | 2.2 × 2 | 39 |
| 3-6 | 6 | 35 | 3 × 2 | 41 |
| 3-7 | 4 | 38 | 3 × .5 | 42 |
| Control | >55 | >50 | 5 × 2.5 | >100 |

These results show that all of the plasticizer-fibre mixtures dispersed in SBR much better than the dry fibre, and that the best dispersion was obtained with aromatic oil as the plasticizer.

EXAMPLE 4

The procedure of Example 3 was essentially repeated, using the same mixtures of plasticizer and fibre, but with a butadiene-acrylonitrile copolymer rubber (KRYNAC 34.50) in place of SBR. The observed results are given in Table 3.

TABLE 3

| | NUMBERS OF UNDISPERSED MATS | | | |
|---|---|---|---|---|
| PLASTICIZER | >1 mm | <1 mm | LARGEST (mm) | TOTAL |
| Sunpar 2280 | 26 | 26 | 4 × 2 | 52 |
| Sunthene 480 | 35 | >50 | 9 × 1.5 | >85 |
| Sundex 8125 | 34 | >50 | 4 × 2 | >84 |
| Dioctyl phthalate | 0 | 5 | 1 × .5 | 5 |
| Dioctyl adipate | 5 | 29 | 3.5 × .5 | 34 |
| Hercoflex 600 | 5 | 33 | 2.5 × 2 | 38 |
| Plastikator OT | 9 | 48 | 3 × 1.5 | 57 |
| None | 12 | >50 | 2 × 2 | >62 |

These results show that in nitrile rubber the presence of mineral oil plasticizers does not give a degree of dispersion measurably better than the control. The polar plasticizers are notably better, with dioctyl phthalate being outstanding.

EXAMPLE 5

The procedure of Example 3 was essentially repeated, with varying plasticizer content, on the composition of SBR+aromatic oil (Sundex 8125), and nitrile+dioctyl phthalate (DOP). The technique of diluting the oils with solvent (n-hexane and ethyl alcohol respectively) was retained. Nominal loadings were varied to include plasticizer/fibre ratios of 0.5/1, 0.75/1 and 1.5/1. The actual ratios were determined by weighing the oil-moistened fibre after solvent removal, as before. Neoprene W (polychloroprene) was included in the tests. The fibre loading was 10 phr in all cases, as before. The observed results are given in Table 4.

TABLE 4

| | | | NUMBERS OF UNDISPERSED MATS | | | |
|---|---|---|---|---|---|---|
| POLYMER | PLASTICIZER | PHR | >1 mm | <1 mm | LARGEST (mm) | TOTAL |
| SBR(1502) | Sundex 8125 | 5 | 5 | 25 | 2 × 1 | 30 |
| NBR(34.50) | DOP | 5 | 4 | 8 | 2 × 2 | 12 |
| NEOPRENE W | Sundex 8125 | 5 | 4 | >50 | 2 × .5 | >54 |
| NEOPRENE W | DOP | 5 | 15 | >50 | 4 × 1 | >55 |
| SBR(1502) | Sundex 8125 | 7.5 | 3 | 26 | 2 × .7 | 29 |
| NBR(34.50) | DOP | 7.5 | 0 | 5 | 2 × .3 | 5 |
| NEOPRENE W | Sundex 8125 | 7.5 | 10 | 46 | 3 × 1 | 56 |
| NEOPRENE W | DOP | 7.5 | 6 | >50 | 4 × 1 | >56 |

TABLE 4-continued

| | | | NUMBERS OF UNDISPERSED MATS | | | |
|---|---|---|---|---|---|---|
| POLYMER | PLASTICIZER | PHR | >1 mm | <1 mm | LARGEST (mm) | TOTAL |
| SBR(1502) | Sundex 8125 | 15 | 0 | 16 | 1 × .2 | 16 |
| NBR(34.50) | DOP | 15 | 1 | 5 | 2 × .5 | 6 |
| NEOPRENE W | Sundex 8125 | 15 | 14 | 30 | 1.5 × 6 | 44 |
| NEOPRENE W | DOP | 15 | 8 | 24 | 4 × 3 | 32 |

EXAMPLE 6

Experiments were conducted on a larger scale, using a Brabender internal mixer. A Brabender with cam rotors was used, the speed being 77 rpm and starting temperature about 25° C. In all cases the mixture consisted of polymer, 50 g; fibre, 5 g., and plasticizer, 5 g. In some experiments according to the invention, dried fibre was treated with plasticizer before the mixing operation. In other, control experiments as noted, the ingredients were combined in a different order. The experimental details were as follows:

Experiment 6-1—SBR1502+Sundex 8125 aromatic oil

Half of the rubber was charged, then half of the oil-treated fibre. The remaining rubber and oil/fibre was charged in alternating portions, the total charging time being 1.5 minutes. Mixing was continued for a further 4 minutes. The final temperature was 84° C. The mix was banded on a cool 4"×9" mill, giving ¾ cuts and 4 endwise passes, then sheeted off.

Experiment 6-2—Nitrile rubber+DOP

The general procedure was identical to #6-1, except that charging was completed in 55 seconds. Final temperature was 92° C.

Experiment 6-3 (control)—SBR 1502+Sundex 8125

The rubber was charged first, then the dried fibre, then the oil. Total charging time was 2 minutes. Mixing was continued for a further 4 minutes as before, and the final temperature was 80° C. The mill finishing procedure was carried out as in Experiments 6-1 and 6-2.

Experiment 6-4 (control)—Nitrile rubber+DOP

The procedure was nominally the same as in Experiment 6-3. The charging time was 2.5 minutes and the final temperature 95° C.

Experiment 6-5 (control)—SBR 1502+Sundex 8125

In this case the rubber was charged first, then the oil, and finally the fibre. The charging time was 3 minutes 10 seconds, and the final temperature was 85° C. Mill finishing was conducted as before.

Experiment 6-6 (control)—Nitrile rubber+DOP

The procedure was nominally the same as in Experiment 6-5. The charging time was 3.5 minutes and the final temperature 96° C.

The observed results are given in Table 5.

TABLE 5

| | | | NUMBERS OF UNDISPERSED MATS | | | |
|---|---|---|---|---|---|---|
| EXPT. NO. | TYPE | PROCEDURE | >1 mm | <1 mm | LARGEST (mm) | TOTAL |
| 6-1 | SBR/Sundex | Pre-Oiled Fibre | 10 | 45 | 5 × 2 | 55 |
| 6-2 | NBR/DOP | Pre-Oiled Fibre | 0 | 7 | 1 × .2 | 7 |
| 6-3 | SBR/Sundex | Polymer-Fibre-Oil | 32 | >50 | 8 × 2 | >82 |
| 6-4 | NBR/DOP | Polymer-Fibre-Oil | 13 | >50 | 4 × 3 | >63 |
| 6-5 | SBR/Sundex | Polymer-Oil-Fibre | 25 | >50 | 11 × 5 | >75 |
| 6-6 | NBR/DOP | Polymer-Oil-Fibre | 32 | >50 | 11 × 2 | >82 |

EXAMPLE 7

Large scale experiments were conducted in which fibre-polymer mixtures were prepared in a Banbury mixer. Fibrillated aramid fibre (KEVLAR) was used. The plasticizer was dioctyl phthalate and the polymer was a butadiene-acrylonitrile copolymer (nitrile) rubber.

The KEVLAR wet lap, in sheet form as supplied by the manufacturer, was dried in a vacuum oven at 80° C. to constant weight. Portions of the dried sheets were treated by hand with DOP, adding small amounts with a brush, first to one side of the sheet and then to the other, until an amount of DOP equal in weight to that of the dry KEVLAR had been uniformly adsorbed. Part of the dried fibre was retained without treatment as a control.

Experiment 7-1

A model B Banbury was used, speed 77 rpm. At 0 minutes, 1000 g of nitrile polymer KRYNAC 34.50 was charged. Cold water was turned on and ran continuously throughout. At ½ minute the ram was raised and the addition of 200 g of the treated fibre, in individual sheets approximately 12×12 cm, was begun. The addition was completed after 2 minutes and the ram was lowered. At 6 minutes, the product was discharged. Final batch temperature was 114° C. The mix was banded on a 10"×20" mill and mixed for approximately 2 minutes with continuous ¾ cuts. It was then sheeted off.

Small portions of the samples obtained in this work were retained and inspected. Most of the fibre was dispersed but there remained a substantial number of undispersed aggregates, ranging in size up to about 5×2 mm. A 10×10 cm area contained 48 aggregates with an estimated average size of 3×0.7 mm.

Experiment 7-2

In this experiment, ½ of the polymer was charged initially, then all of the treated fibre (compacted into one large chunk) then the remainder of the polymer was charged and the ram was lowered. At 2 minutes, the ram was raised for about 15 seconds, the chute was inspected and the ram was lowered again. At four minutes the mix was discharged. The final temperature was 113° C.

The batch was milled and sheeted off as before. Once again, most of the fibre was well dispersed. Undispersed aggregates were smaller in size, on the average, than in the mix from Experiment 7-1. A 10×10 cm sheet contained 44 aggregates, the largest being 8×3 mm, and the average size being estimated as 1.0×0.5 mm.

Experiment 7-3—Control

In this case untreated fibre was used. The procedure was the same as in Experiment 7-1, except that the polymer charge was 1100 g and the fibre charge (dry in this case was 100 g. Final batch temperature was 116° C.

In this case the fibre did not disperse, but remained in the form of large aggregates with an average size of about 6×4 mm.

EXAMPLE 8

Experiments were conducted to prepare polymer-fibre mixtures according to the invention using a conventional rubber mixing mill. Polymers and pretreated fibres were as described in Example 7. The mill was of size 6"×12" and was run with the cooling water circulating.

In the first experiment, 400 g nitrile rubber (KRYNAC 34.50) was banded, and 80 g treated fibre was gradually added. It was observed that too rapid addition caused the mix to fall from the rolls. Addition was kept slow enough to maintain a rolling bank. The total time required was 8 min.

This procedure gave good results. Some aggregates remained; a 10×10 cm area contained 22 aggregates, the largest being 2×0.8 mm and the average being estimated as 1.5×0.4 mm.

In a second experiment, the product formed by Banbury mixing in Experiment 7-2 of Example 7 was used as starting material, to see if further milling would improve the dispersion and reduce the number of residual aggregates. 200 g of the mixture was milled for 4 minutes on a 6"×12" mill with continuous ¾ cuts.

This procedure reduced both the number and size of the larger visible aggregates. A 10×10 cm area contained 27 aggregates, the largest being 3×0.5 mm and the estimated average being 1.5×0.5 mm.

In a third, control experiment, the product of Experiment 7-3 of Example 7 was used, i.e. untreated fiore. The milling procedure was repeated. The milling resulted in a reduction in size of aggregates (to an average size of about 2×4 mm) but on a micro scale the fibre remained essentially undispersed.

EXAMPLE 9

A sheet of dried KEVLAR fibrillated pulp fiber was treated with Dow Corning Silicone Oil Q4-2737 by dropwise distribution of the oil uniformly over the surface. The oil was observed to wet the fiber and to be absorbed into the fibrous matrix. The weight ratio of silicone oil to fiber was 1:5 to 1.

Into a Brabender Plasticorder mixing machine equipped with cam rotors and operating at 75 rpm at room temperature, 55 g of silicone rubber (Dow Corning GR-30) was charged. 13.75 g of the oil-treated KEVLAR fiber was added immediately. 22 g of silica filler was also added, part simultaneously with the treated fiber and a further portion immediately thereafter. Approximately three-quarters of the silica was charged in this initial operation. After 2 minutes mixing the batch was removed and then recharged to the mixer. The remainder of the silica was added and mixing was continued for 2 minutes. The batch was given two further two-minute mixing treatments in the same manner for a total of eight minutes.

The mixture was sheeted out using a two-roll rubber mill. A sheet 36 cm×18 cm was observed to contain only a few visible imperfections, the overall fiber dispersion being classed as excellent.

EXAMPLE 10

Compositions were prepared according to the following formulations.

| EXPERIMENT # | 10-1 | 10-2 | 10-3 |
| --- | --- | --- | --- |
| Part A | | | |
| SBR 1502 | 100 | 100 | 100 |
| N330 Carbon black | 50 | 50 | 50 |
| KEVLAR fiber | — | 10 | 10 |
| Sundex 8125 | 10 | 10 | 10 |
| Stearic acid | 1.5 | 1.5 | 1.5 |
| Santoflex 13 | .5 | .5 | .5 |
| Santoflex 77 | .5 | .5 | .5 |
| Part B | | | |
| DPG | .2 | .2 | .2 |
| Zinc oxide | 3 | 3 | 3 |
| Santocure MS | 1.2 | 1.2 | 1.2 |
| Sulfur | 2 | 2 | 2 |

The compounds were based on 40 g polymer in each case. The Part A ingredients were mixed in a Brabender Plasticorder mixing machine equipped with cam rotors and operating at 70 rpm, starting at room temperature. The polymer was charged initially. In Mix No. 1, the oil and carbon black were charged, along with the other ingredients, during about 1.5 min and the batch was discharged at 4 min. In Mix. No. 2, which is representative of the invention, the fiber and Sundex 8125 had been combined beforehand by distributing the oil throughout a sheet of the dried fiber by dropwise addition from a pipette. The polymer was charged as in Mix No. 1, and the oil-treated fiber was added immediately. The carbon black and other ingredients were charged during the next 1.5 minutes and the mixture was discharged after a total of 4 minutes. Mix No. 3, a control, was prepared in the same way except that the fiber and oil were charged to the mixer at the same time but without having been premixed.

The Part B ingredients were added on a cool laboratory 2-roll mill during a period of 4 minutes in each case. The finished compounds were banded on the mill and allowed a further two minutes milling, without knife cuts, so as to establish a grain direction.

From the milled sheets, micro sheet specimens 25 mm×62 mm×1 mm were press cured for 10 minutes at 160° C. Several sheets with grain orientation parallel to, and at right angles to the length of the sheets, were so prepared. From these sheets, micro dumbbell specimens were died out and subjected to stress-strain tests using conventional procedures. The broken tensile specimens were retained for visual inspection.

It was noted that the presence of yellow undispersed fiber agglomerates was very obvious at the broken ends of the specimens from Mix No. 3, whereas much closer inspection was required to find the relatively few, and much smaller, aggregates in the specimens from Mix No. 2.

The tensile strength, elongation and 100% modulus values were subjected to statistical analysis, with the results shown in Table 6. In this table, n is the number of dumbbell specimens tested, $\bar{x}$ is the average value, and s is the standard deviation of the results. The degree of scatter in the tensile strength and elongation data, as reflected by the standard deviation values, is indicative of degree of inhomogeneity in the rubber. It is seen that the process of the invention (Mix No. 2) results consistently in much reduced standard deviation values as compared to the control (Mix No. 3).

TABLE 6

| EXPT # | TEST DIRECTION | Tensile Strength (MPa) | | | Elongation (%) | | |
|---|---|---|---|---|---|---|---|
| | | n | $\bar{x}$ | s | n | $\bar{x}$ | s |
| 10-1 | Against grain | 19 | 26.7 | 2.09 | 19 | 491 | 25.2 |
| | With grain | 20 | 27.1 | 3.50 | 20 | 491 | 44.0 |
| 10-2 | Against grain | 20 | 12.34 | 2.08 | 20 | 313 | 35.7 |
| | With grain | 20 | 13.81 | 3.30 | 20 | 275 | 69.9 |
| 10-3 | Against grain | 20 | 10.70 | 3.04 | 20 | 278 | 63.4 |
| | With grain | 20 | 13.2 | 3.79 | 20 | 241 | 108.3 |

What is claimed is:

1. A plasticized fibre composition useful for reinforcing polymers, said composition comprising 100 parts by weight of fibrillated fibres selected from the group consisting of cellulose, glass fibres, asbestos, mineral wool, rayon, nylon, polyester, polypropylene and polymeric paraphenylene terephthalamide, and mixtures of two or more of said types of said types of fibres, and from about 80 to about 125 parts by weight of a plasticiser that is liquid at processing temperatures, said plasticizer being compatible with the chosen fibre or fibres and substantially homogeneously dispersed thereon so as effectively to wet the fibre surfaces with the plasticizer.

2. The composition of claim 1 wherein the fibre is an aramid fibre of polymeric paraphenylene terephthalamide having a surface area greater than 1 m²/g.

3. The composition of claim 1 wherein the plasticizer is selected from hydrocarbon and mineral oils, low molecular weight polymers, esters of carboxylic acids, phosphoric acid esters, low molecular weight synthetic resins having melting points below about 150° C., liquid polyethers, liquid polyether/polythioethers, chlorinated paraffins, natural oils and resins and their derivatives.

4. The composition of claim 3 wherein the plasticizer is a hydrocarbon oil selected from the paraffinic, naphthenic and aromatic oils.

5. The composition of claim 3 wherein the plasticizer is an ester of a carboxyalic acid selected from dibutoxyethyl adipate, dibutyl phthalate, dioctyl phthalate, dioctyl sebacate, butyl oleate and triethylene glycol dibenzoate.

6. The composition of claim 3 wherein the plasticizer is selected from a polyether and a polyether/polythioether.

7. The composition of claim 1 wherein the fibre is selected from rayon, nylon, polyester and polypropylene.

8. The composition of claim 1 wherein the fibre is selected from cellulose, glass fibres, asbestos and mineral wool.

9. A process for preparing mixtures of polymers and fibrous material, which comprises:
forming a substantially plasticized fibrous material composition by treating 100 parts by weight of fibre selected from the group consisting of cellulose, glass fibres, asbestos, mineral wool, rayon, nylon, polyester, polypropylene and polymeric paraphenylene terephthalamide and mixtures of two or more of said types of fibre with from about 80 to about 125 parts by weight of a plasticizer that is liquid at processing temperatures, and mixing the plasticized fibrous material composition with a polymer selected from natural rubber and synthetic elastomeric or thermoplastic polymeric material,
said plasticizer being compatible with the chosen fibrillated fibre or fibres and substantially homogeneously dispersed thereon so as effectively to wet the fibre surfaces with plasticizer.

10. The process according to claim 9 wherein the polymer is selected from natural rubber and synthetic elastomeric polymeric materials.

11. The process of claim 9 wherein the polymer is selected from synthetic thermoplastic polymeric materials.

12. The process of claim 9 wherein the fibrous material is a fibrillated fibre used in an amount of from about 0.25 to about 100 parts by weight per 100 parts by weight of polymer.

13. The process of claim 9 wherein the fibre is a fibrillated synthetic organic fibre selected from rayon, nylon, polyester, polypropylene and polymeric paraphenylene terephthalamide.

14. The process of claim 9 wherein the fibre is a fibrillated fibre selected from cellulose, glass fibres, asbestos and mineral wool.

15. The process of claim 10 wherein the polymer is selected from natural rubber, styrene-butadiene copolymers, polyisoprene, butadiene-acrylonitrile copolymers, carboxylated styrene-butadiene polymers, carboxylated butadiene-acrylonitrile polymers, polymers comprising chloroprene, polymers comprising acrylic monomers, ethylene-propylene copolymers, polybutadiene, styrene-butadiene block copolymers, butyl rubber and halogenated butyl rubbers, EPDM rubbers and halogenated EPDM rubbers, silicone rubbers and chlorosulphonated polyethylene.

16. The process of claim 15 wherein the fibre is an aramid fibre of polymeric paraphenylene terephthalamide having a surface area greater than 1 m²/g.

17. The process of claim 11 wherein the polymer is selected from polyethylene and the thermoplastic copolymers of ethylene, polypropylene and the thermoplastic copolymers of propylene, polystyrene and impact polystyrene, polybutene, polyvinyl chloride and the thermoplastic copolymers of vinyl chloride, polyvinylidene chloride and the thermoplastic copolymers of vinylidene chloride, styrene-acrylonitrile polymers, butadiene-styrene-acrylonitrile polymers, polyesters, polyamides and polycarbonates.

18. The process of claim 17 wherein the fibre is an aramid fibre of polymeric paraphenylene terephthalamide having a surface area greater than 1 m²/g.

19. The process of claim 9 wherein the plasticizer is selected from hydrocarbon and mineral oils, low molecular weight polymers, esters of carboxylic acids, phosphoric acid esters, low molecular weight synthetic resins having melting points below about 150° C., liquid polyethers, liquid polyether/polythioethers, chlorinated paraffins, natural oils and resins and their derivatives.

20. The process of claim 9 wherein the fibre is an aramid fibre of polymeric paraphenylene terephthalamide having a surface area of greater than 1 $m^2/g$, the plasticizer is a hydrocarbon oil and the polymer is selected from natural rubber, styrene-butadiene copolymers, polybutadiene, butyl rubber, halogenated butyl rubber, ethylene-propylene copolymer, and EPDM.

21. The process of claim 9 wherein the fibre is an aramid fibre of polymeric paraphenylene terephthalamide having a surface area of greater than 1 $m^2/g$, the plasticizer is selected from $C_4$–$C_{12}$ esters of dibasic organic acids, phosphate esters, polyethers and polyether/polythioethers and the polymer is a butadiene-acrylonitrile copolymer.

22. The process of claim 9 wherein the fibre is an aramid fibre of polymeric paraphenylene terephthalamide having a surface area of greater than 1 $m^2/g$, the plasticizer is a hydrocarbon oil and the polymer is selected from chlorosulphonated polyethylene, chlorobutyl, bromobutyl and polychloroprene.

23. The process of claim 9 wherein the fibre is an aramid fibre of polymeric paraphenylene terephthalamide having a surface area of greater than 1 $m^2/g$, the plasticizer is silicone oil and the polymer is a silicone rubber.

* * * * *